Jan. 22, 1924.

B. J. RAY

TRAP

Filed Nov. 27, 1922    2 Sheets-Sheet 1

1,481,740

B. J. Ray, INVENTOR

BY Victor J. Evans, ATTORNEY

WITNESSES

Jan. 22, 1924.
B. J. RAY
TRAP
Filed Nov. 27, 1922    2 Sheets-Sheet 2
1,481,740
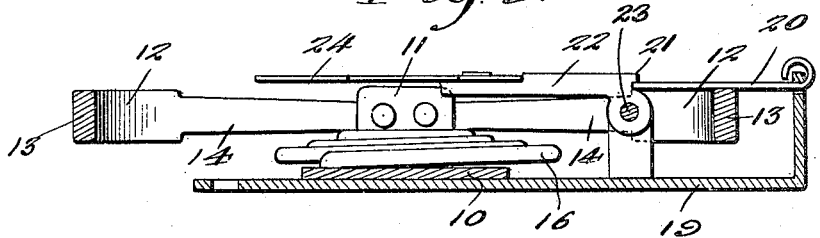
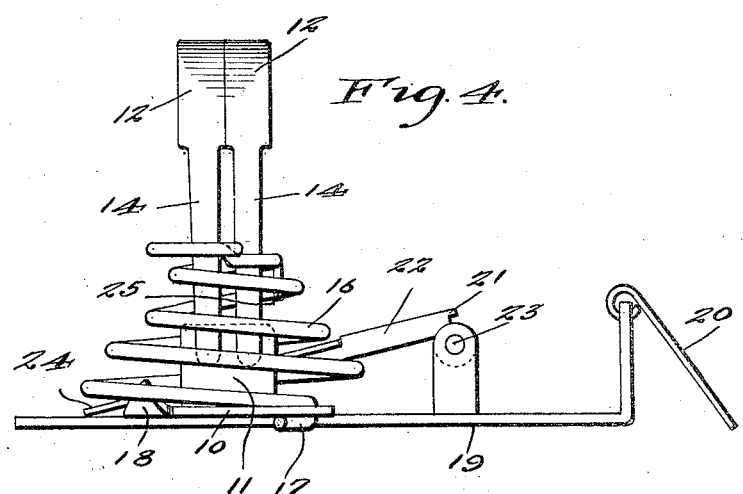
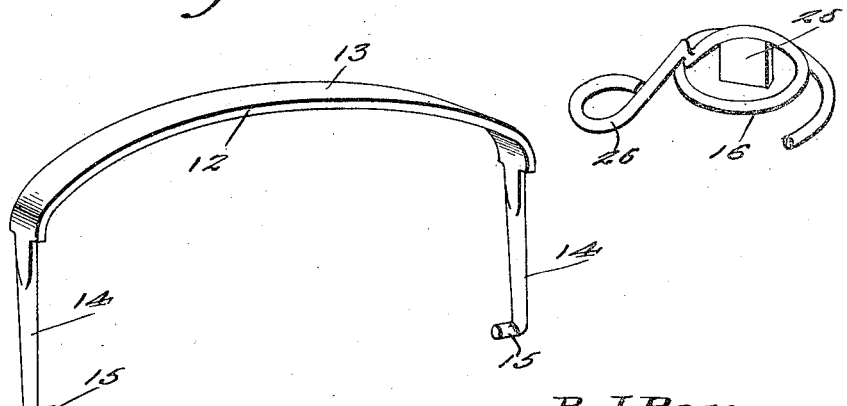

Patented Jan. 22, 1924.

1,481,740

UNITED STATES PATENT OFFICE.

BERTRAM J. RAY, OF DELTA, COLORADO.

TRAP.

Application filed November 27, 1922. Serial No. 603,550.

*To all whom it may concern:*

Be it known that I, BERTRAM J. RAY, a citizen of the United States, residing at Delta, in the county of Delta and State of Colorado, have invented new and useful Improvements in Traps, of which the following is a specification.

This invention relates to improvements in traps and has for an object the provision of a trap especially designed for trapping animals.

Another object of the invention is the provision of a trap which includes a pair of pivotally mounted spring actuated jaws, the latter being so constructed and arranged as to insure substantially tight closing when the trap is sprung.

Another object of the invention is the provision of a novel spring arrangement for actuating the jaws, the springs occupying a substantially flat position to permit the jaws to open to their widest extent when the trap is set and exerting an even pressure on both of said jaws to insure simultaneous closing action and at the same time permitting the trigger of the trap to be easily actuated, so that the jaws will respond to a slight touch.

With the above and other objects in view, the invention includes the following novel features and details of construction, to be hereinafter more fully described, illustrated in the accompanying drawings and pointed out in the appended claims.

In the drawings :—

Figure 3 is a central transverse sectional view.

Figure 4 is an end view of the trap closed.

Figure 5 is a detail perspective view of one of the jaws.

Figure 6 is a similar view of the spring equalizing means.

Figure 1:
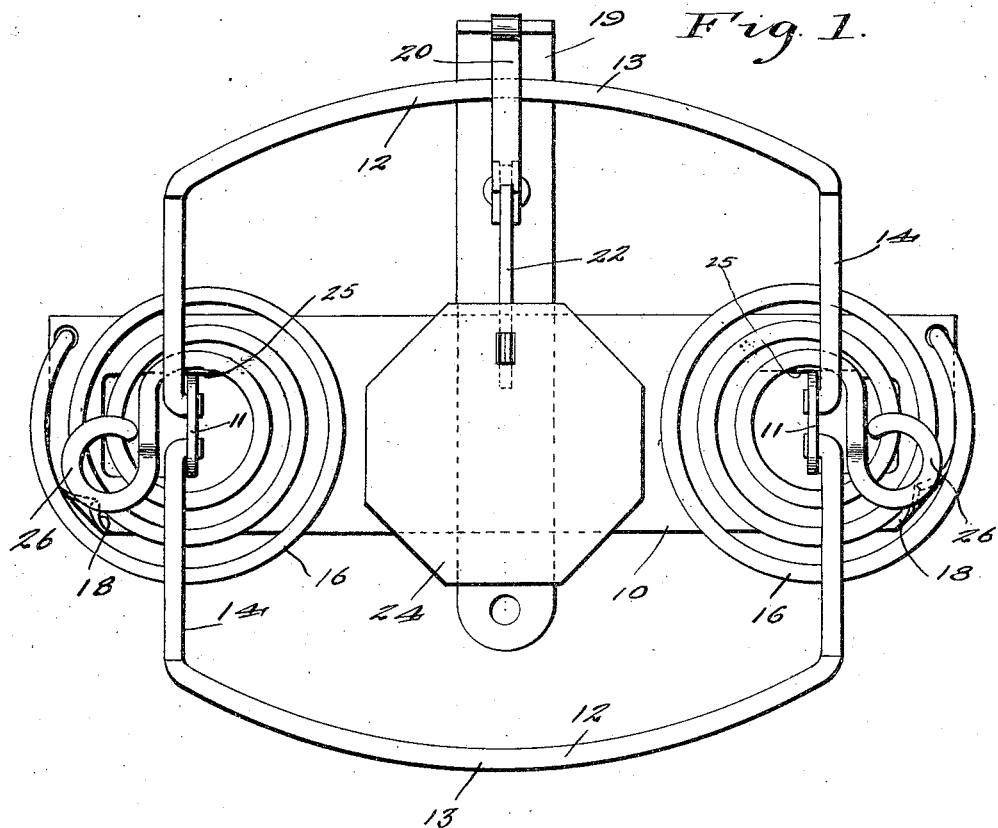
Figure 1 is a plan view showing the trap in open or set position.
Figure 2:
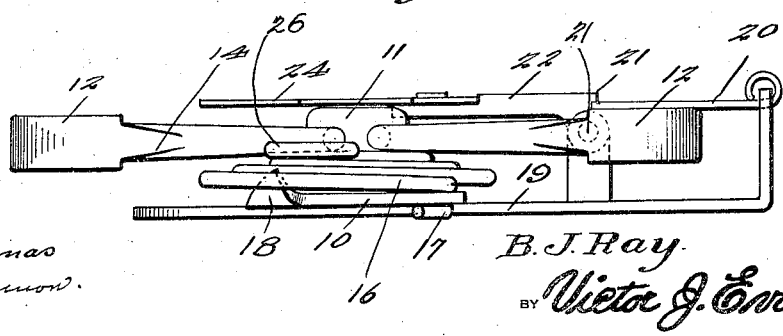
Figure 2 is an end view of the same.

Referring in detail to the drawings, wherein like characters of reference denote corresponding parts, the reference character 10 indicates the base of the trap, which has extending upwardly therefrom adjacent each end, a lug 11, the latter being preferably struck up from the base as shown.

Pivotally mounted upon each of the lugs 11 are the opposite ends of jaws 12, the latter being of novel construction and including preferably curved substantially flat portions 13 which are adapted to closely engage when the trap is sprung, and arms 14 which extend from the ends of the flat portions 13 and are spaced apart when the jaws are in closed position. The arms 14 are narrower than the width of the flat portions 13 so as to provide this spacing and the extremities of the said arms are bent to provide pintles or trunnions 15 which are pivotally movable in spaced openings provided in the lugs 11. By constructing the jaws in the manner shown and described, the latter will be permitted a close contacting engagement when the trap is sprung and will overcome a serious objection to many traps of this type, wherein the brush and other material within which the trap is usually hidden, remains between the pivoted ends of the jaws and prevents their effective closing operation.

Surrounding the arms 14 of the jaws are coiled springs 16, of conical formation, the lower and largest end of the springs being secured to the base 10 by positioning the ends of the springs through an opening 10' and bending their extremities beneath the bottom of the base, as shown at 17. The springs are held against lateral movement by means of seats 18 which tightly engage one of their lower convolutions.

By employing springs of conical formation, the said springs will lie substantially flat upon the base 10 when the jaws are open and the trap is set, the coils of the spring lying within one another.

Extending from the base 10 is an arm 19 having pivotally mounted at its upstanding end a trigger 20 and the latter is adapted to engage a lug 21 provided upon the inner end of an arm 22. This last mentioned arm is pivotally mounted upon the arm 19 as shown at 23 and has secured upon its free end a pan 24 which is adapted to receive bait to attract an animal. When the trap is set, one of the jaws 12 will be positioned beneath the trigger 20 and will be released by the downward pressure of the pan 24 when an animal attempts the removal of the bait.

In order that the springs 16 may exert an even pressure upon the jaws 12 when the trap is set, the upper and smallest convolution of each of the springs have secured to their under portions, lugs 25 which engage the lugs 11 which extend from the base 10 and cause this spring to set level, so that the proper pressure will be properly distributed for the effective operation of the trap. A small lever 26 is provided for use in setting the trap.

The invention is susceptible of various changes in its form, proportions and minor details of construction and the right is herein reserved to make such changes as properly fall within the scope of the appended claim.

Having described the invention what is claimed is:—

A trap comprising a base, a pair of jaws pivotally mounted thereon, said jaws including substantially flat contacting portions and spaced pivotally mounted arms extending from the ends of the contacting portions, means including a pivotally mounted bait pan for holding the jaws in set position for release by an animal, conical coiled springs surrounding the spaced arms and having their largest ends secured to the base for forcing the jaws closed when the holding means is released and lugs secured to the upper restricted convolutions of the springs for engagement with the base, whereby the springs will be substantially level when the trap is set.

In testimony whereof I affix my signature.

BERTRAM J. RAY.